(12) United States Patent
Flanagan et al.

(10) Patent No.: US 8,937,603 B2
(45) Date of Patent: Jan. 20, 2015

(54) METHOD AND APPARATUS FOR HAPTIC VIBRATION RESPONSE PROFILING AND FEEDBACK

(75) Inventors: Adrian Flanagan, Raheen (IE); Mel J. Conway, Broadford (IE); Susan Michelle Pratt, Caherconlish (IE); Eoghan Moloney, Raheen (IE); Eoin E. English, Dromkeen (IE)

(73) Assignee: Analog Devices, Inc., Norwood, MA (US)

( * ) Notice: Subject to any disclaimer, the term of this patent is extended or adjusted under 35 U.S.C. 154(b) by 150 days.

(21) Appl. No.: 13/433,105

(22) Filed: Mar. 28, 2012

(65) Prior Publication Data

US 2012/0249462 A1    Oct. 4, 2012

Related U.S. Application Data

(60) Provisional application No. 61/470,764, filed on Apr. 1, 2011.

(51) Int. Cl.
*G06F 3/041*    (2006.01)
*G06F 3/0488*   (2013.01)
*G06F 1/16*     (2006.01)
*G06F 3/01*     (2006.01)

(52) U.S. Cl.
CPC ............ *G06F 3/041* (2013.01); *G06F 3/04886* (2013.01); *G06F 1/1694* (2013.01); *G06F 2200/1637* (2013.01); *G06F 3/016* (2013.01)
USPC ........................................................ 345/173

(58) Field of Classification Search
None
See application file for complete search history.

(56) References Cited

U.S. PATENT DOCUMENTS

| 7,102,541 | B2  | 9/2006  | Rosenberg |
|-----------|-----|---------|-----------|
| 7,502,011 | B2  | 3/2009  | Braun et al. |
| 7,843,277 | B2  | 11/2010 | Gregorio et al. |
| 8,072,614 | B2  | 12/2011 | Deliwala |
| 2002/0191029 | A1 | 12/2002 | Gillespie et al. |
| 2004/0056840 | A1* | 3/2004 | Goldenberg et al. ......... 345/156 |
| 2006/0038793 | A1 | 2/2006  | Philipp |
| 2006/0197753 | A1 | 9/2006  | Hotelling |
| 2007/0203545 | A1 | 8/2007  | Stone et al. |
| 2008/0216001 | A1 | 9/2008  | Ording et al. |
| 2009/0051667 | A1 | 2/2009  | Park et al. |
| 2009/0066660 | A1 | 3/2009  | Ure |
| 2009/0106655 | A1 | 4/2009  | Grant et al. |
| 2009/0160809 | A1 | 6/2009  | Yang et al. |

(Continued)

OTHER PUBLICATIONS

International Search Report and Written Opinion dated Jul. 20, 2012 in PCT/US2012/031279, filed Mar. 29, 2012.

(Continued)

*Primary Examiner* — Joseph Feild
*Assistant Examiner* — Parul Gupta
(74) *Attorney, Agent, or Firm* — Kenyon & Kenyon LLP

(57) ABSTRACT

Embodiments of the present invention may provide a device to adaptively generate a haptic effect. The device may include a controller to generate a haptic command associated with a haptic profile and a haptic driver to generate a drive signal based on the haptic command, wherein the drive signal causes an actuator to produce vibrations corresponding to a haptic effect. Further, the device may include a sensor, coupled mechanically to the actuator, to measure at least one property of the vibrations. The controller may adjust the haptic command according to the measured at least one property. Therefore, the device may continuously tune haptic effect generation according to vibration measurements.

22 Claims, 5 Drawing Sheets

(56) References Cited

U.S. PATENT DOCUMENTS

| | | |
|---|---|---|
| 2009/0278030 A1 | 11/2009 | Deliwala |
| 2009/0278800 A1 | 11/2009 | Deliwala |
| 2009/0279106 A1 | 11/2009 | Deliwala |
| 2009/0279107 A1 | 11/2009 | Deliwala |
| 2009/0281765 A1 | 11/2009 | Deliwala |
| 2009/0307105 A1 | 12/2009 | Lemay et al. |
| 2009/0309825 A1 | 12/2009 | Sodergren et al. |
| 2009/0322496 A1 | 12/2009 | Da Costa |
| 2010/0050784 A1 | 3/2010 | Joung |
| 2010/0079391 A1 | 4/2010 | Joung |
| 2010/0123667 A1 | 5/2010 | Kim et al. |
| 2010/0134409 A1 | 6/2010 | Challener et al. |
| 2010/0134428 A1 | 6/2010 | Oh |
| 2010/0141399 A1 | 6/2010 | Swope |
| 2010/0156818 A1 | 6/2010 | Burrough et al. |
| 2010/0169766 A1 | 7/2010 | Duarte et al. |
| 2010/0171715 A1 | 7/2010 | Peterson et al. |
| 2010/0214250 A1 | 8/2010 | Gillespie et al. |
| 2010/0231513 A1 | 9/2010 | Deliwala |
| 2010/0277435 A1 | 11/2010 | Han et al. |
| 2010/0281440 A1 | 11/2010 | Underkoffler et al. |
| 2010/0305418 A1 | 12/2010 | Deliwala |
| 2011/0050617 A1 | 3/2011 | Murphy et al. |
| 2011/0069024 A1 | 3/2011 | Kim |
| 2011/0075835 A1* | 3/2011 | Hill ............................. 379/418 |
| 2011/0090153 A1 | 4/2011 | Park et al. |
| 2011/0093778 A1 | 4/2011 | Kim et al. |
| 2011/0291976 A1 | 12/2011 | Takada et al. |
| 2012/0056825 A1 | 3/2012 | Ramsay et al. |
| 2012/0087575 A1 | 4/2012 | Winn et al. |
| 2012/0102436 A1 | 4/2012 | Nurmi |
| 2012/0105357 A1 | 5/2012 | Li et al. |
| 2014/0139328 A1* | 5/2014 | Zellers et al. .............. 340/407.2 |

OTHER PUBLICATIONS

International Search Report and Written Opinion dated Jun. 29, 2012 in PCT/US2012/031272, filed Mar. 29, 2012.

International Search Report and Written Opinion dated Jul. 20, 2012 in PCT/US2012/31003, filed Mar. 28, 2012.

International Search Report and Written Opinion dated Jun. 20, 2012 in PCT/US2012/30994, filed Mar. 28, 2012.

Sorger, Johannes. "Alternative User Interfaces", Vienna University of Technology, Dec. 1, 2007, <http://128.131.166.46/courses/Seminar/WS2007/Sorger.pdf> pp. 1-11.

* cited by examiner

100

100

110

300

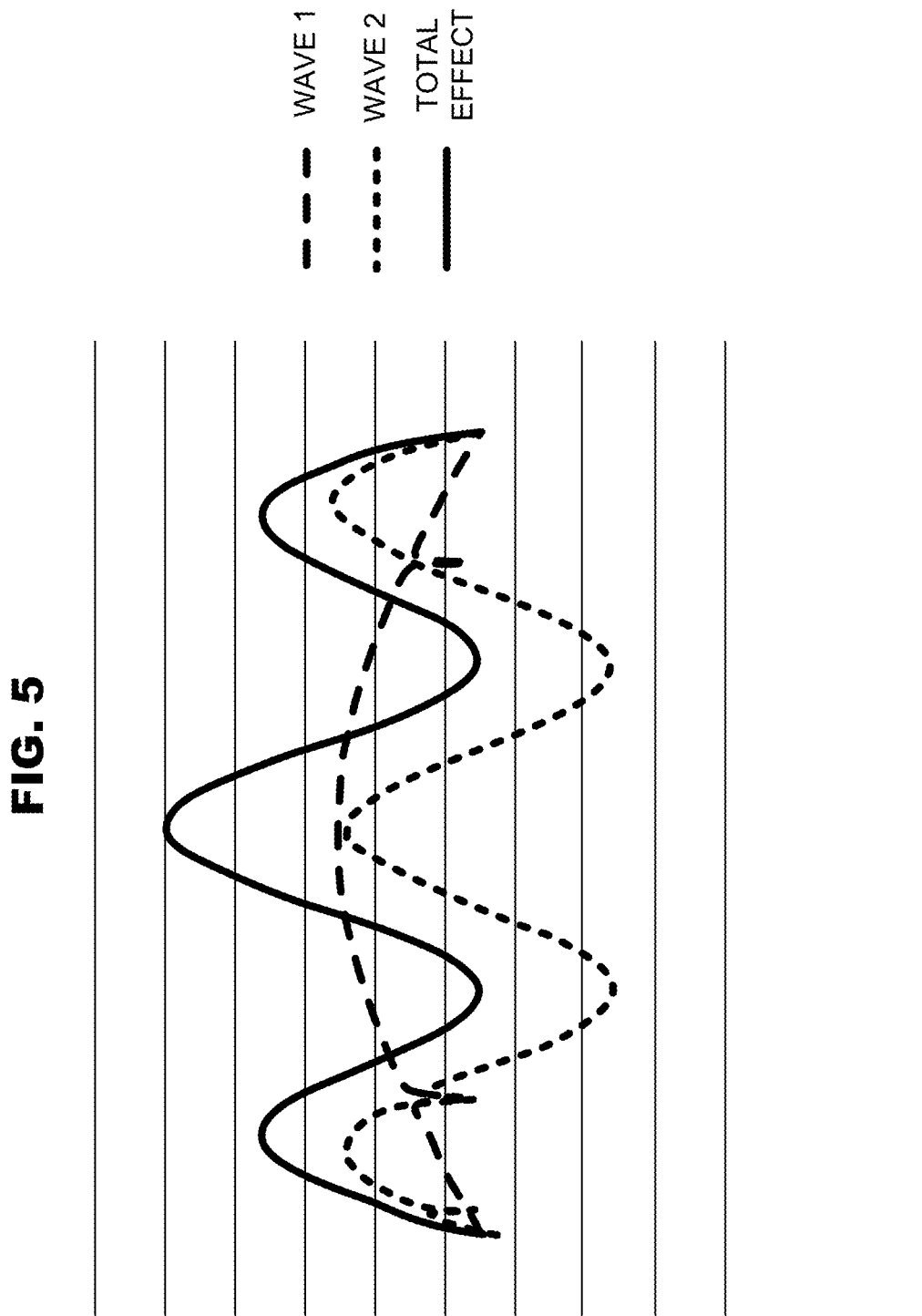

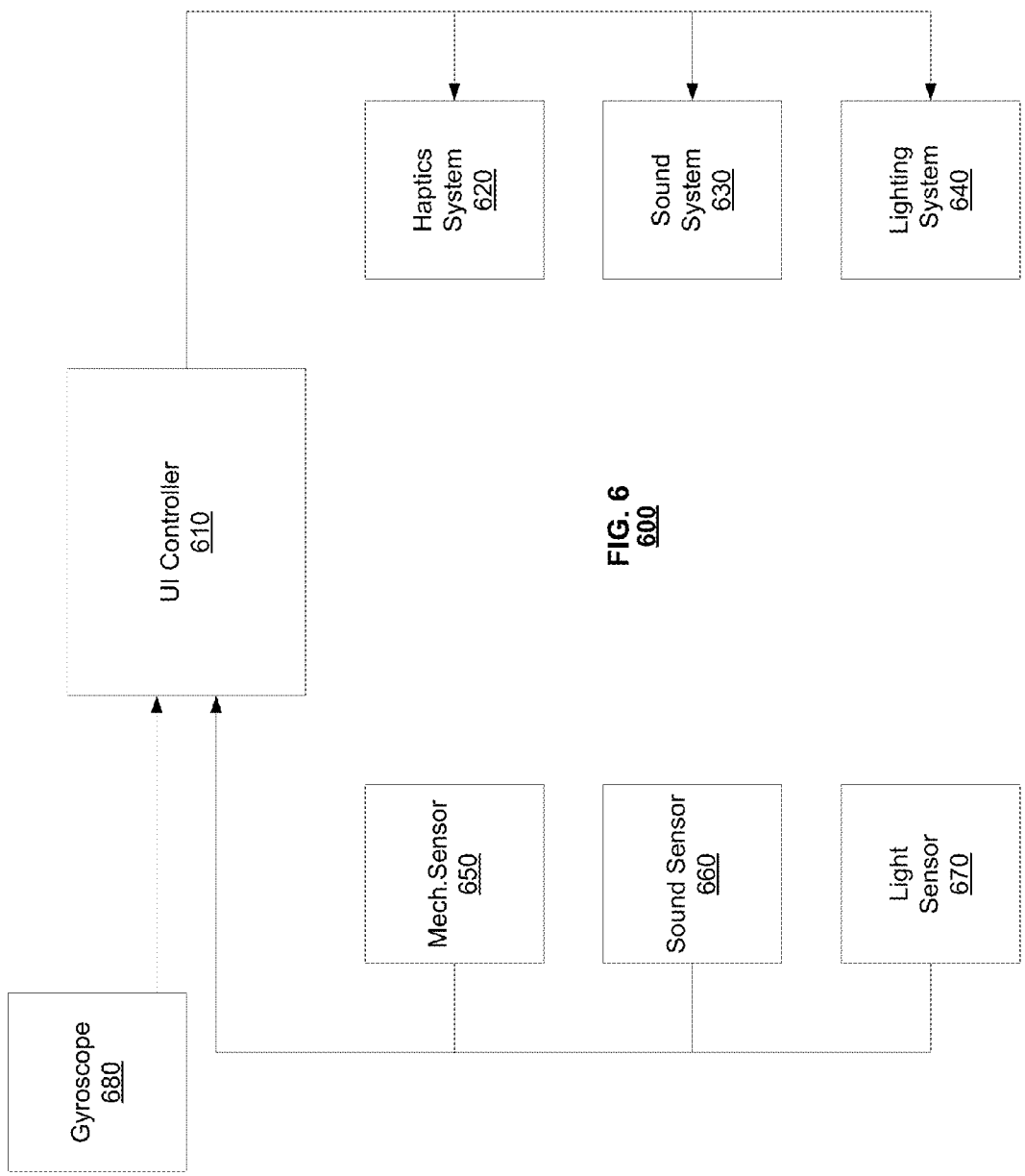

METHOD AND APPARATUS FOR HAPTIC VIBRATION RESPONSE PROFILING AND FEEDBACK

RELATED APPLICATIONS

This application claims priority to provisional U.S. Patent Application Ser. No. 61/470,764, entitled "Touch Screen and Haptic Control" filed on Apr., 1, 2011, the content of which is incorporated herein in its entirety.

BACKGROUND

The present invention relates to user interface control and haptics generation.

Haptics refers to the sense of touch. In electronic devices, haptics relates to providing a touch sensory feedback to the user. Electronic devices incorporating haptics may include cell phones, PDAs, gaming devices, etc. The user interacts with electronic devices through a user interface, such as a touch screen; however, the user often does not know if the user's desired function was recognized or is being performed by the electronic device. Thus, electronic devices generate a haptic feedback in the form of a vibro-tactile sensation (e.g. a simulated "click") to alert the user of the electronic device's performance. Stated differently, haptic feedback lets the user know what is going on with the electronic device. In a gaming electronic device, for example, haptics can provide a sensory stimuli according to game interactions.

Haptic feedback can be generated by electro-mechanical systems. An electrical system produces a drive signal that will then cause a mechanical system to produce the haptic effect. For example, an actuator incorporating a moving mass can be used to generate haptic effects. A linear resonant actuator (LRA) is an example of one such actuator in which a moving mass is spring loaded. For efficient haptic generation using an LRA, the spring loaded mass may be driven at its mechanical resonant frequency, which is the natural vibration frequency of the spring loaded mass. Also, the magnitude of the haptic effect may be controlled by the amplitude of the actuator driving signal.

In some conventional systems, BEMF (Back Electromotive Force) is used to tune the actuator. BEMF is an electrical signal that is induced into a the electrical connections of the motor by the movement of a permanent magnet (which as a mass) relative to a stationary wire wound coil. In theory, the BEMF signal will have electrical properties (e.g., frequency, amplitude) that correspond to the mechanical vibrations in the actuator. However, the BEMF measurements may be unreliable at times because of electrical interferences in the system and, thus, may not provide accurate representation of the vibrations.

Hence, the inventors recognized a need in the art for an adaptive haptic effect generation technique based on accurate representations of the mechanical vibrations.

BRIEF DESCRIPTION OF THE DRAWINGS

FIG. 5 illustrates an interference pattern according to an embodiment of the present invention.

FIG. 6 is a simplified block diagram of feedback generation system according to an embodiment of the present invention.

DETAILED DESCRIPTION

Embodiments of the present invention may provide a device to adaptively generate a haptic effect. The device may include a controller to generate a haptic command associated with a haptic profile and a haptic driver to generate a drive signal based on the haptic command, wherein the drive signal causes an actuator to produce vibrations corresponding to a haptic effect. Further, the device may include a sensor, coupled mechanically to the actuator, to measure the vibrations. The controller may adjust the haptic command according to a property of the measured vibrations. Therefore, the device may continuously tune haptic effect generation according to vibration measurements.

Figure 1A:
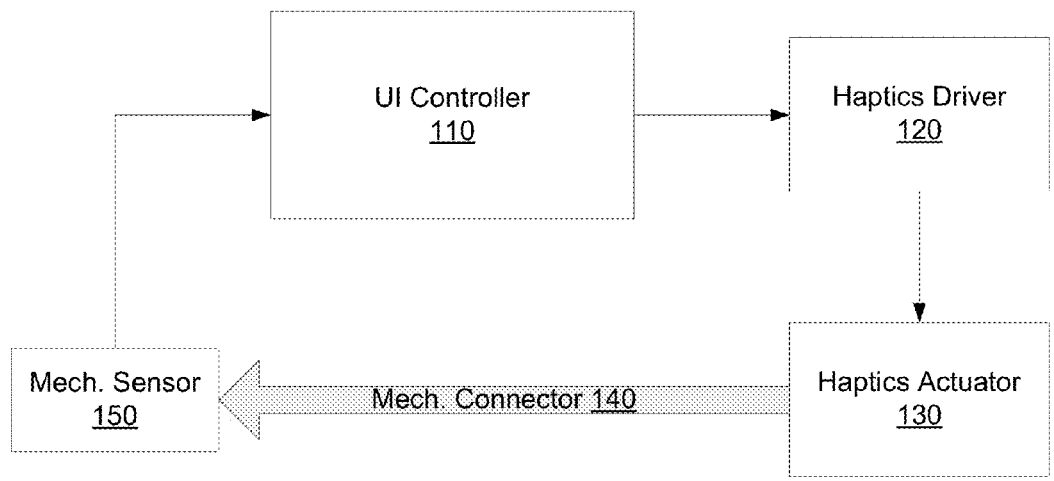
FIG. 1(a) is a simplified block diagram of a haptic generation system according to an embodiment of the present invention.
Figure 1B:
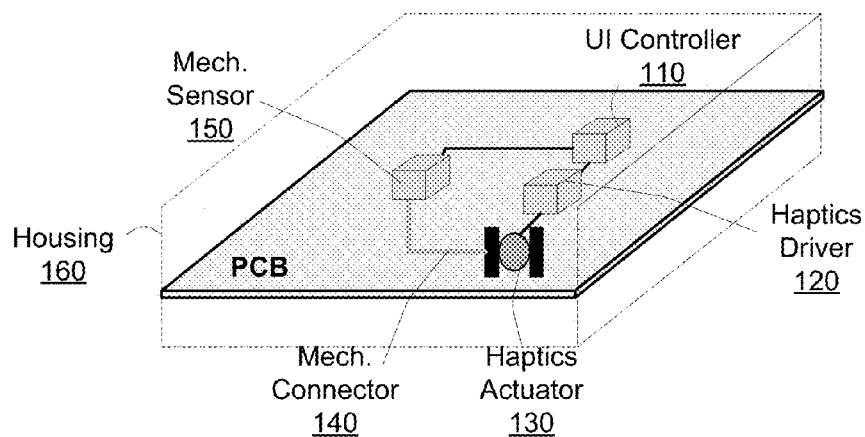
FIG. 1(b) is a simplified block component diagram of haptic generation system according to an embodiment of the present invention.

FIG. 1(a) is a simplified block diagram and FIG. 1(b) is a simplified component block diagram of an adaptive haptic generation system 100 according to an embodiment of the present invention. The system 100 may include a User Interface (UI) controller 110, a haptics driver 120, a haptics actuator 130, a mechanical connector 140, a mechanical sensor 150, and a housing 160. The system 100 may be provided within a consumer electronic device such as a cell phone, PDA, gaming device, etc.

The UI controller 110 may be coupled to the haptics driver 120 and a mechanical sensor 150. The UI controller 110 may generate a control signal based on a desired haptic effect and may transmit the control signal to the haptics driver 120. For example, a user may select an icon on a touchscreen, and the UI controller 110 may generate a control signal corresponding to a desired haptic effect such as a clicking vibration to provide a feedback stimuli.

Figure 2:
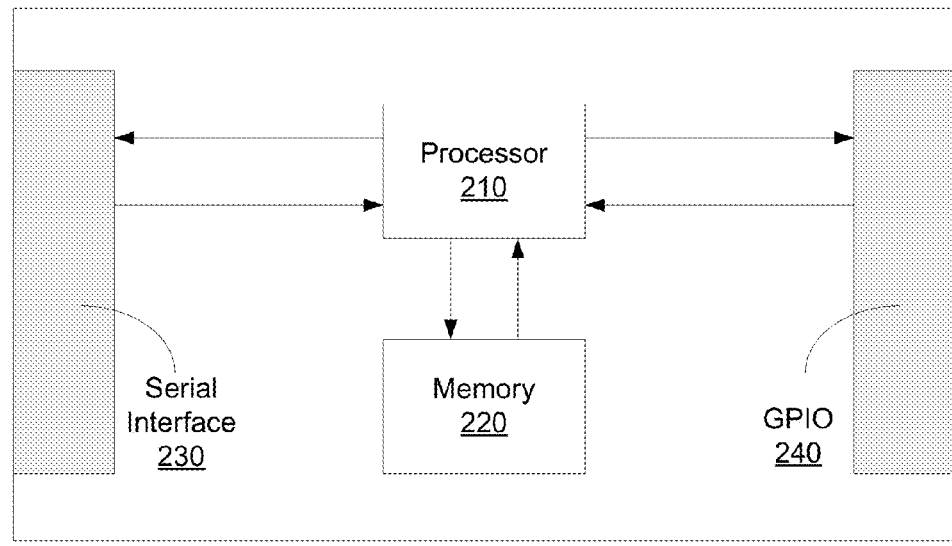
FIG. 2 is a simplified block diagram of a user interface (UI) controller according to an embodiment of the present invention.

FIG. 2 is a block diagram of a UI controller 110 from FIG. 1 according to an embodiment of the present invention. The UI controller 110 may include a processor 210, a memory 220, a serial interface 230, and a general purpose input/output (GPIO) 240.

The processor 210 may control the operations of the UI controller 110 according to instructions saved in the memory 220. The memory 220 may also store sensor data from the coupled mechanical sensor 150, and the memory 220 may store haptic effect profiles as will be described below. The memory 220 may be provided as a non-volatile memory, a volatile memory such as random access memory (RAM), or a combination thereof.

The serial interface 230 may connect to the coupled mechanical sensor 150. The serial interface 230, for example, may be provided as high speed 12C interfaces. The GPIO 240 may connect to the haptics driver 120. The UI controller 110 may also be coupled to a host system (not shown) of the device via the GPIO 240.

Returning to FIG. 1, the haptics driver 120 may receive the control signal from the UI controller 110 and may generate a drive signal based on the control signal. The drive signal may be an analog signal. The drive signal may be a current signal or a voltage signal.

The haptics driver 120 may be coupled to the haptics actuator 130. The haptics actuator may be embodied as piezoelectric elements, linear resonant actuators (LRAs), eccentric rotating mass actuators (ERMs), and/or other known actuator types. The haptics driver 120 may transmit the drive signal to the haptics actuator 130 causing it to vibrate according to the drive signal properties. The vibrations may be felt by the user providing a vibro-tactile sensory feedback stimuli.

In an embodiment, the haptics actuator 130 may include a mechanical system such as a motor that vibrates to generate the desired haptic effect. For example, the haptics actuator 130 may include a coil motor with a spring loaded mass and a permanent magnet. The coil motor may cause the spring loaded mass to vibrate to generate the haptic effect. The haptics actuator 130 may also include magnetic coils to generate the motion.

The vibrations may also be captured by the mechanical sensor 150 via the mechanical connector 140. The mechanical connector 140 may be provided as a printed circuit board (PCB) where other components, including the UI controller 110, the haptics driver 120, the haptics actuator 130, and/or the mechanical sensor 150, may be mounted. The mechanical sensor 150 may be provided as an accelerometer sensor. For example, the mechanical sensor 150 may be provided as a Microelectromechanical Systems (MEMS) accelerometer sensor. Further, the MEMS accelerometer may be provided as a single axis or multi-axis sensor(s) to measure force(s) corresponding to the vibrations in the haptics actuator 130.

The mechanical sensor 150 may measure mechanical properties of the generated haptic effect vibrations, and may transmit the measured mechanical properties to the UI controller 110. In response to the measured mechanical properties, the UI controller 110 may adjust the control signal for the respective haptic effect.

In operation, the UI controller 110, responsive to a user action, may generate a control signal corresponding to a particular haptic effect. The control signal may be a haptic effect command. The UI controller 110 may generate the control signal based on a stored haptic effect profile associated with the desired haptic effect.

FIG. 1(b) is a simplified component block diagram of the adaptive haptic generation system 100 according to an embodiment of the present invention. The UI controller 110, haptics driver 120, and mechanical sensor 150 may provided as circuit components that are mounted on a printed circuit board (PCB). The PCB and its mounted circuit components may be provided inside a housing 160. The UI controller 110 may be electrically coupled to the haptics driver 120 and the mechanical sensor, for example via electrical traces on the PCB. The haptics driver 120 may also be electrically coupled to the haptics actuator 130.

The haptics actuator 130 may include a mechanical system such as a motor that vibrates to generate the desired haptic effect. For example, the haptics actuator 130 may include a coil motor with a spring loaded mass and a permanent magnet. The coil motor may cause the spring loaded mass to vibrate to generate the haptic effect. The haptics actuator may also include magnetic coils to generate the motion. In an embodiment, the haptics actuator 130 may be connected to the housing 160. Hence, when the haptic actuator 130 is driven and vibrates, the connected housing 160 may also vibrate, which may be felt by a user.

The haptics actuator 130 may be coupled to the mechanical sensor 150 via the mechanical connector 140. In an embodiment, the mechanical connector 140 may be provided as the printed circuit board PCB on which other components, including the UI controller 110, the haptics driver 120, the haptics actuator 130, and/or the mechanical sensor 150, may be mounted. The mechanical sensor 150 may be provided as an accelerometer sensor. For example, the mechanical sensor 150 may be provided as a Microelectromechanical Systems (MEMS) accelerometer sensor. Further, the MEMS accelerometer may be provided as a single axis or multi-axis sensor(s) to measure force(s) corresponding to the vibrations in the haptics actuator 130.

The mechanical sensor 150 may measure the vibrations (i.e., haptic effect) generated inside the housing 160 by the haptics actuator 130. The mechanical sensor 150 may measure mechanical properties of the generated haptic effect vibrations, and may transmit the measured mechanical properties to the UI controller 110. In response to the measured mechanical properties, the UI controller 110 may adjust the control signal for the respective haptic effect.

Figure 3:
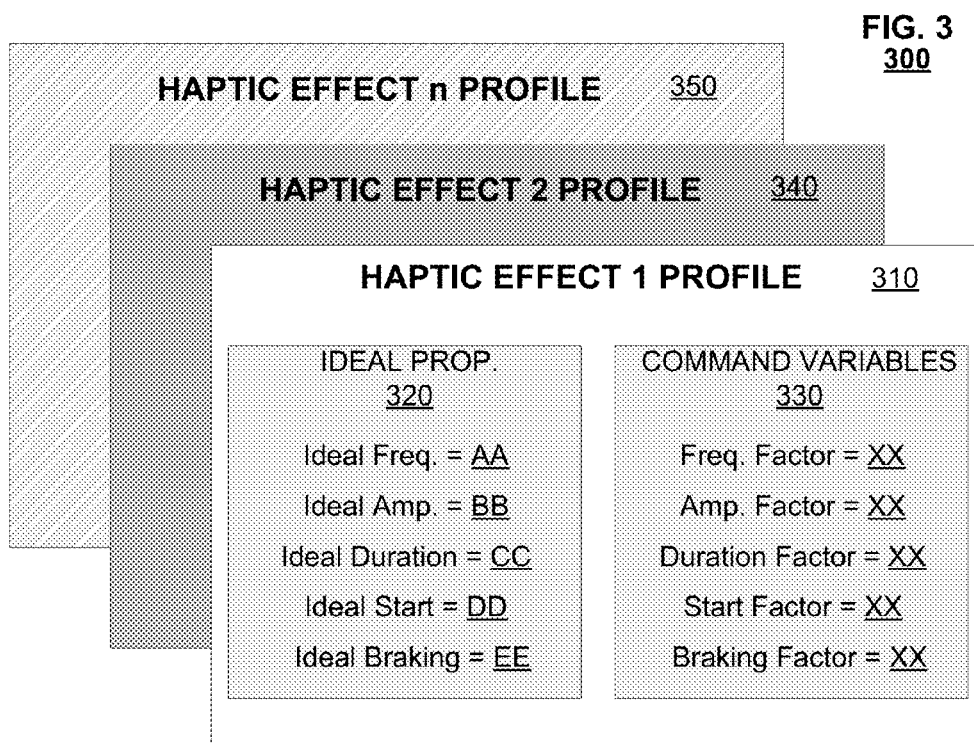
FIG. 3 illustrates exemplary haptic profile representations according to an embodiment of the present invention.

FIG. 3 illustrates an exemplary representation of haptic effect profiles according to an embodiment of the present invention. The haptic effect profiles may be stored in the memory 220 of the UI controller 110 of FIGS. 1 and 2. The memory 220 may store a plurality of haptic effect profiles 310, 340, 350 and each haptic effect profile may correspond to a unique haptic effect.

Each haptic effect profile, for example Haptic effect 1 profile 310, may include two sets of information, ideal properties 320 and their corresponding command variables 330. In an embodiment of the present invention, the ideal properties 320 may be provided as read-only information with respect to the UI controller 110. For example, the ideal properties 320 may be pre-programmed into the UI controller 110 or may be programmed by the host system.

The ideal properties 320 may include values corresponding to various characteristic of the respective haptic effect. For example, the ideal properties 320 may include an ideal frequency value, which may correspond to a desired resonant frequency of the haptic effect. The ideal properties 320 may include an ideal amplitude value, which may correspond to a desired magnitude (i.e., "volume") of the haptic effect. The ideal properties may include an ideal duration value, which may correspond to a desired length of the haptic effect. The ideal properties may include an ideal start value, which may correspond to a desired initial vibratory feature of the haptic effect. For example, some haptic effects may have a ramping feature that gradually increases in magnitude over the duration of the haptic effect. The ideal properties may include an ideal braking value, which may correspond to how the haptic effect is stopped. For example, some haptic effects may use a braking technique to slow the vibration using the actuator's natural frequency rather than using an abrupt stop.

Each ideal property value may have a corresponding command variable 330. The command variables 330 may be associated with the control signal that will effectuate the respective haptic effect and, consequently, the desired haptic effect properties. In an embodiment, the UI controller 110 may generate a control signal (i.e., haptic command) using the command variables 330 that will correspond to a drive signal that will generate the desired haptic effect.

For example, a frequency factor may be haptic command variable that causes the haptic actuator 130 to vibrate at an ideal resonant frequency for that respective haptic effect. An amplitude factor may be a haptic command variable that causes the haptic actuator 130 to vibrate at an ideal magnitude for that respective haptic effect. A duration factor may be a haptic command variable that causes the haptic actuator 130 to vibrate for an ideal length for that respective haptic effect. A start factor may be a haptic command variable that causes the haptic actuator 130 to begin vibrating in a certain manner for the initial phase of that respective haptic effect. A braking factor may be a haptic command variable that causes the haptic actuator 130 to stop vibrating in a certain manner for that respective haptic effect.

Ideally, the vibrations of the haptic effect would display the associated ideal properties 320 of the command variables 330. However, various factors such as manufacturing irregularities or wear and tear of parts may lead to discrepancies between the ideal properties and actual properties of the generated haptic effect. Thus, haptic effect generation may be adaptively tuned according to an embodiment of the present invention.

Consequently, the command variables 330 may be programmable by the UI controller 110. The command variables 330 may be adjusted continuously, dynamically, and/or iteratively. According to an embodiment of the present invention, the UI controller 110 may adjust the command variables 330 based on measurement values received from the mechanical sensor 150. The adjustments may synchronize the actual measured properties towards the ideal properties 320 of the respective haptic effect. Thus, the UI controller 110 may compare the received measurement values to the stored ideal properties 320, and based on the comparison(s), the UI controller 110 may adjust the command variables 330 accordingly.

In an embodiment of the present invention, the adjustments may be applied to the current haptic effect from which the measurements were procured. In other words, the UI controller 110 and haptics driver 120 may cause the haptics actuator 130 to vibrate to generate the desired haptic effect. The mechanical sensor 150 may measure the mechanical properties of the haptic effect and may report the measured values to the UI controller 110. Based on the comparison(s) between the measurement values and ideal properties, the UI controller 110 may adjust the haptic command while the current haptic effect is still occurring. The haptics driver 120, in turn, may drive the haptic actuator 130 according to the adjusted haptic command, which will adjust the current haptic effect before it has finished.

In another embodiment of the present invention, the adjustments may applied to a subsequent haptic effect request. Thus, the adjustments may be saved, and the next time that haptic effect is requested, the UI controller 110 may generate the haptic command based on the saved adjustments.

In an embodiment of the present invention, the command variables 330 may be provided as look up tables (LUTs). The current factors for the command variables 330 may be indicated by a pointer, which may be incremented/decremented based on the comparison(s) between the measurement values and ideal properties.

Figure 4A:
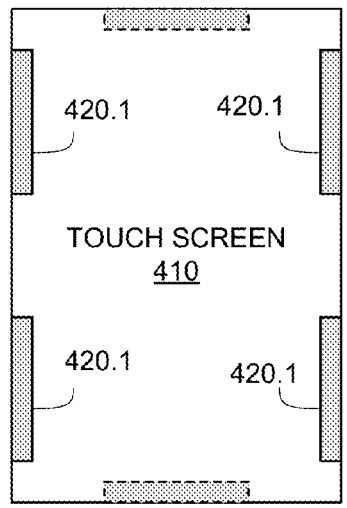
FIGS. 4(a)-4(c) illustrate haptic actuator configurations according to embodiments of the present invention.

Haptic elements may be provided at different locations inside the electronic device. The haptic effect may vary depending on the location of the haptic elements. FIG. 4 illustrates configurations 400 of piezoelectric actuators for use in accordance with embodiments of the present invention. As illustrated in FIG. 4(a), piezoelectric elements 420.1 may be affixed to a bottom surface of a touch screen 410. In this embodiment, the piezoelectric elements 420.1 may be integrated with the touch screen 410 and may be provided at a layer above certain optically active elements of the screen (for example, higher than the LCD panel and backlight). For example, the piezoelectric elements 420.1 may be affixed to a glass layer of the screen, which typically is the layer that a user touches directly when interfacing with the touch screen 410. In this embodiment, the piezoelectric elements may be provided at locations toward a periphery of the glass layer, outside the viewable area of the touch screen 410. Electrical activation of the piezoelectric elements may cause flexion in a direction normal to the touch screen surface (up and down).

Figure 4B:
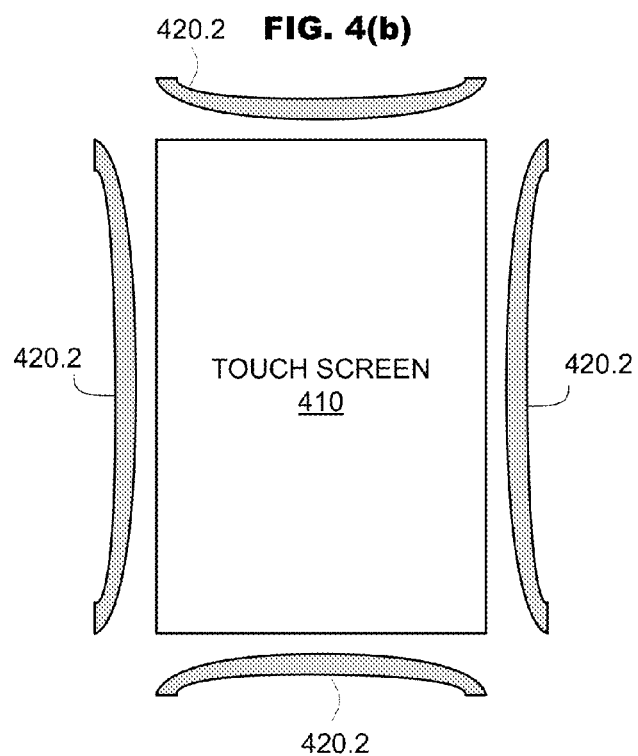

As illustrated in FIG. 4(b), piezoelectric elements 420.2 may be affixed to a periphery of a touch screen 410. Electrical activation of the piezoelectric element may cause flexion in a direction parallel to the touch screen 410 (laterally in the X and/or Y direction). This embodiment places the piezoelectric elements 220.2 at locations that are off the viewable area of the touch screen 410.

Figure 4C:
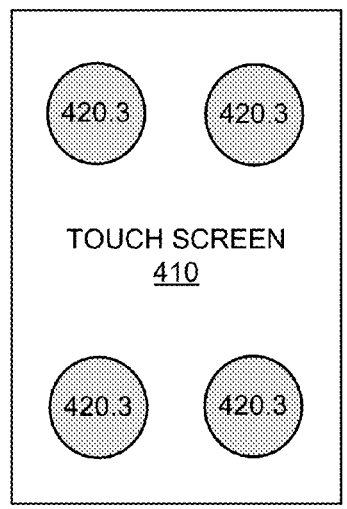

As illustrated in FIG. 4(c), piezoelectric elements 420.3 may be provided under a touch screen 410. In this embodiment, the piezoelectric elements may be provided below the touch screen device 410 under the optically active elements of the screen (e.g. below the LCD, backlight, etc.). In this case, the piezoelectric elements 420.1 may be located anywhere along the lower surface of the screen. Electrical activation of the piezoelectric elements 420.2 may cause flexion in a direction normal to the touch screen surface (up and down). Although piezoelectric elements are illustrated above, embodiments of the present invention also permit use of LRAs or ERMs.

In an embodiment, a haptics driver may assert drive signals to the haptics actuators in a manner to create deflection waves laterally across a surface of the touch screen. Consider the configuration shown in FIG. 4(a). In this configuration, haptics elements are provided at edges of the touch screen in four or, optionally, six locations. Each of the elements may be driven with a periodic activation pulse that causes deflection wave to radiate laterally across a screen surface away from the respective elements. Owing to the inertia of the touch screen, digital activation pulses may generate waves on the touch screen surface that are approximately sinusoidal. In such an embodiment, a haptics driver may control a frequency and phase of drive signals to individual haptics elements to tailor deflection waves that emanate from each actuator. Through constructive and destructive interference of these waves, the haptics driver may control the shape, orientation and magnitude of haptics effects.

FIG. 5 is a graph illustrating a simulated interference pattern that may be generated across a surface of a touch screen according to an embodiment of the present invention. In this example, wave 2 has a frequency that is five times higher than wave 1. As illustrated, the waves constructively interfere to cause a spike at a central position of the graph. The position of the spike may be shifted laterally within the graph by manipulating the phase of each wave. The shape of the total effect may be controlled by manipulating the frequency of each wave and the numbers of waves radiated onto the surface.

During operation, a haptics driver may control the frequency and phase of waves surface waves generated on a touch screen surface. In an embodiment, the frequency and phase may be adjusted based on mechanical sensor feedback measurements as described herein. To generate a spatially narrow sharp effect, waves may be controlled to provide a relatively large spike. The generate a spatially broader effect, waves may be controlled to provide a wider spike. Further, during operation, as a user's finger moves across the surface of the touch screen, the haptics driver may manipulate phase of the surface waves output to the touch screen in order to cause the waves to track the user's finger. Moreover, a haptics driver may convey a feeling of texture by manipulating both phase and frequency. In an application where a textured surface is displayed by the device (for example, in a gaming application), a haptic texture effect may be rendered as a user's finger slides along the displayed textured surface.

Principles of this invention may also find application in other adaptive sensory feedback generation. For example, a haptic effect may be accompanied with an auditory effect and/or a visual effect to provide a multi-sensory feedback stimulation. FIG. 6 is a simplified block diagram of an adaptive multi-sensory feedback system 600 according to an embodiment of the present invention. The system 600 may include a User Interface (UI) controller 610, a haptics system 620, a sound system 630, a lighting system 640, a mechanical sensor 650, a sound sensor 660, and a light sensor 670. The system 600 may also include a gyroscope 680. The system 600 may be incorporated into an electronic device such as a cell phone, PDA, gaming device, etc.

The UI controller 610 may control the haptic system 620, which may include a haptics driver and haptics actuator, to generate a haptic effect according to mechanical sensor 650 measurements as described above.

The UI controller 610 may also control a sound system 630 to generate an auditory effect. The sound system 630 may include an audio driver and a speaker. The auditory effect may be captured by the sound sensor 660, for example a microphone. As described above with respect to haptic effects, the UI controller 610 may adjust the auditory effect based on the sound sensor 660 measurements.

Furthermore, the UI controller 610 may control a lighting system 640 to generate a visual effect, for example a change in the backlight of the display or touchscreen. The lighting system 640 may include display driver such as a LED/LCD driver. The visual effect may be captured by the light sensor 670. As described above with respect to haptic effects, the UI controller 610 may adjust the visual effect based on the light sensor 670 measurements.

In an embodiment of the present invention, orientation information from the gyroscope 680 may be taken into account when generating sensory effects. For example, the gyroscope 680 may provide information regarding orientation state of the device. In turn, the UI controller 610 may generate or adjust a haptic command based on the orientation information.

Those skilled in the art may appreciate from the foregoing description that the present invention may be implemented in a variety of forms, and that the various embodiments may be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and following claims.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be implemented, for example, using a computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disc Read Only Memory (CD-ROM), Compact Disc Recordable (CD-R), Compact Disc Rewriteable (CD-RW), optical disk, magnetic media, magneto-optical media, removable memory cards or disks, various types of Digital Versatile Disc (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

We claim:

1. A device, comprising:
   a controller to generate a haptic command associated with a haptic profile;
   a haptic driver to generate a plurality of drive signals based on the haptic command, wherein the plurality of drive signals cause a plurality of actuators to produce vibration waves, wherein interference of the vibration waves corresponds to a haptic effect; and
   a sensor, coupled mechanically to the plurality of actuators, to measure vibrations of the haptic effect;
   wherein the controller is configured to adjust the haptic command according to a property of the measured vibrations, including frequency adjustment of at least one of the plurality of drive signals to control a shape of the haptic effect and phase adjustment of at least one of the plurality of drive signals to control a location of the haptic effect.

2. The device of claim 1, further comprises a housing, wherein the controller, haptic driver, and actuator are provided inside the housing, and wherein the sensor measures vibrations generated inside the housing.

3. The device of claim 1, wherein the sensor is an accelerometer sensor.

4. The device of claim 1, wherein the at least one property includes an amplitude level of the vibrations.

5. The device of claim 1, wherein the at least one property includes a resonant frequency of the vibrations.

6. The device of claim 1, wherein the controller comprises
   a memory to store the haptic profile, the haptic profile including data representing an ideal property of the vibrations; and
   a processor to compare the estimated property and the ideal property, and based on the comparison, adjust the haptic command.

7. The device of claim 6, wherein the processor updates the associated haptic profile according to the adjustment.

8. The device of claim 1, further comprises a gyroscope.

9. The device of claim 1, wherein the adjusted haptic command is applied to the haptic effect before the haptic effect concludes.

10. The device of claim 1, wherein the adjusted haptic command is applied to a subsequent haptic effect.

11. A method to generate a haptic effect, comprising:
generating a haptic command based on a haptic effect profile;
converting the haptic command to a plurality of drive signals that generate vibration waves by a plurality of actuators producing a haptic effect through interference of the vibration waves;
receiving a mechanical measurement value corresponding to vibrations the haptic effect; and
adjusting the haptic command based on the mechanical measurement value, including adjusting a frequency of at least one of the plurality of drive signals to control a shape of the haptic effect and adjusting a phase of at least one of the plurality of drive signals to control a location of the haptic effect.

12. The method of claim 11, wherein the mechanical measurement value relates to an amplitude of the vibrations.

13. The method of claim 11, wherein the mechanical measurement value relates to a resonant frequency of the vibrations.

14. The method of claim 11, further comprises comparing the mechanical measurement value with an ideal value in the haptic effect profile, and based on the comparison, adjusting the haptic command.

15. The method of claim 14, further comprises updating the haptic effect profile according to the adjusted haptic command.

16. The method of claim 11, wherein the adjusted haptic command is applied to the haptic effect before the haptic effect concludes.

17. The method of claim 11, wherein the adjusted haptic command is applied to a subsequent haptic effect.

18. A method to generate a haptic effect, comprising:
generating a first drive signal to cause a first actuator to produce a first vibration wave;
generating a second drive signal to cause a second actuator to produce a second vibration wave, wherein interference of the vibration waves generate the haptic effect;
receiving mechanical measurement value(s) corresponding to vibrations of the haptic effect;
based on the mechanical measurement value(s), adjusting a frequency of at least one of the drive signals to control shape of the haptic effect; and
based on the mechanical measurement value(s), adjusting a phase of at least one of the drive signals to control a location of the haptic effect.

19. The method of claim 18, further comprises comparing the mechanical measurement value(s) with an ideal value in a haptic effect profile, and based on the comparison, adjusting the frequency or phase.

20. The method of claim 19, further comprises updating the haptic effect profile according to the adjustments.

21. The method of claim 18, wherein the adjustments are applied to the haptic effect before the haptic effect concludes.

22. The method of claim 18, wherein the adjustments are applied to a subsequent haptic effect.

* * * * *